Dec. 7, 1965 F. A. GUERTH 3,222,003

DRIVE MECHANISM FOR TAPE RECORDERS AND/OR REPRODUCERS

Filed May 23, 1963

INVENTOR.
FRITZ A. GUERTH

BY Howard J. Murray Jr. AGENT
George J. Rubens ATTORNEY 3,222,003
Patented Dec. 7, 1965

3,222,003
DRIVE MECHANISM FOR TAPE RECORDERS AND/OR REPRODUCERS

Fritz A. Guerth, 50 Lori Road, Camarillo, Calif.

Filed May 23, 1963, Ser. No. 282,816
4 Claims. (Cl. 242—55.14)
(Granted under Title 35, U.S. Code (1952), sec. 266)

Figure 1:
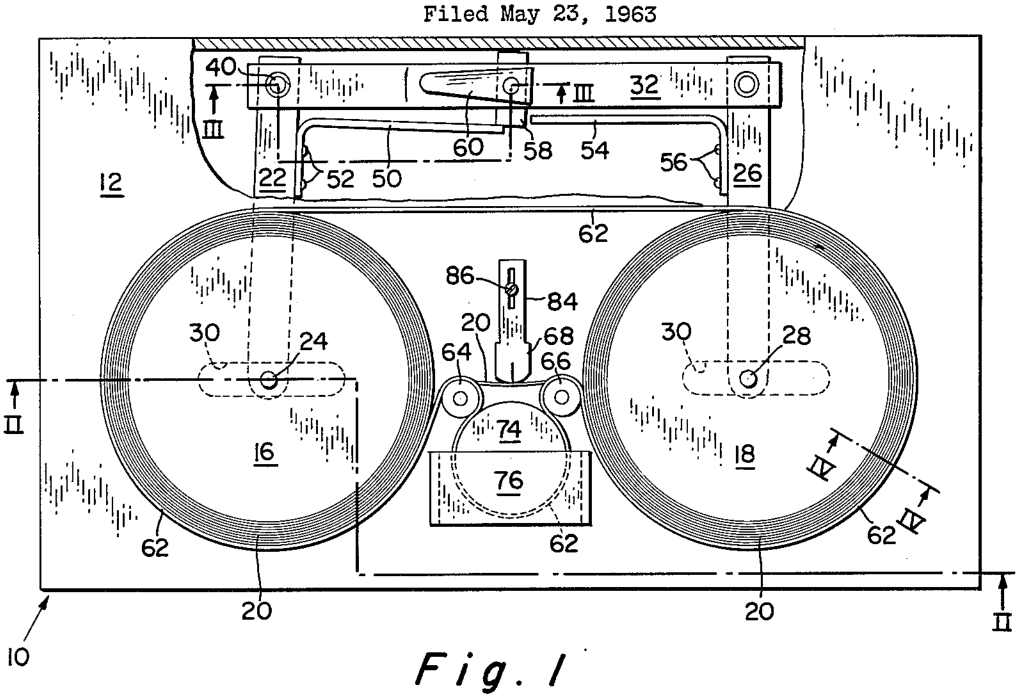

The invention described herein may be manufactured and used by or for the Government of the United States of America for governmental purposes without the payment of any royalties thereon or therefor.

The present invention relates to tape recorders and/or reproducers, and more particularly to an arrangement for eliminating any distortion in the recording and/or reproduction of intelligence which results from irregularities either in the configuration of the recording medium or in the motion thereof during operation. Such irregularities may, for example, include both "skewing" and "flutter" of the tape, especially when the apparatus is operated at the relatively high speeds necessary for the processing of data which is subject to rapid fluctuations in one or more of its characteristics.

In the usual form of tape recording mechanism, it is customary to supply driving power to the take-up reel on which the recording medium is being wound, and also to apply a force to the supply reel from which the tape is being unwound so that the sensitized medium is maintained under a definite degree of tension during movement thereof. The tape is thus precluded from possessing excessive slack in the region of the head, which slack, when present, creates variations in tape speed past the recording gap and hence results in undesirable positional variations either in the recorded data or in the quality of reproduction.

However, many conventional recorders inherently cause changes in tape configuration to appear following periods of use. For example, slight displacements of the tape in a transverse direction as it passes over the guide rollers will stretch the tape unevenly and, after repeated usage, the edges of the tape will actually present a "scalloped" appearance. Consequently, any data which is located near the edges of the tape will not necessarily be reproduced fatihfully throughout the life of the recording.

In addition to the factors above set forth, the tension under which the tape operates in conventional mechanisms results in a distinct possibility of breakage or splitting, especially after the tape has undergone considerable aging and loses some of its pliability. Then, too, the irregular forces to which the tape may be subjected during high speed operation greatly decrease its life expectancy.

It would be highly desirable to provide a device in which successive layers of tape on a reel or spool are maintained perfectly flat against one another until such time as the outermost layer of tape leaves the supply reel and enters into the region of the recording and/or playback head. Moreover, if both the supply and take-up reels are located in close proximity to the recording head, there would be an extremely short distance over which the tape would be unsupported, and hence there would be very little opportunity for sidewise vibration or flutter. To achieve optimum operation, it is further deisrable that all stress and tension be removed from the tape while it is in the recording and/or reproducing region. The present invention has for its principal objective the provision of such an apparatus.

In a preferred embodiment of the invention, a continuous belt of some non-stretchable material (such for example as Mylar) is disposed so as to partially encircle each reel of tape and to lie in direct contact with the outermost tape layer wound on each reel. This belt is preferably formed with a pair of flanged edges which extend inwardly and hence enclose at least the outer layer of tape within the region formed by these projecting extremities. At a point between the two reels, the belt passes in sequence over a pair of capstans each of which is synchronously driven by some suitable power source. It is an important characteristic of the invention that the tape does not follow the path of the belt between these capstans, but instead extends in unsupported fashion across the gap established therebetween. The length of the belt is so chosen that the tape will extend across this gap without any appreciable flexing even at high operating speeds, and also without any tension being placed thereupon. As the tape crosses the gap, it passes over a recording head which contacts the tape with only sufficient pressure to maintain a constant engagement therebetween.

Since the tape is out of contact with the encircling belt for only the distance between the two capstans, there is less opportunity for the tape to acquire any sidewise flutter or "skew." Furthermore since the belt partially encircles each reel of tape, each tape layer is pressed tightly against the remaining tape layers, and this action tends to maintain the tape flat and to prevent the edges thereof from becoming "scalloped."

The present disclosure thus provides for improved fidelity of operation in a tape recorder and/or reproducer and in addition prolongs the useful life of the recording medium. These advantages are of particular importance during the recordation of data which has a high recurrence frequency. In practice, a device designed in accordance with the present disclosure has operated successfully with the tape moving at a speed of 400 inches per second. Such operation cannot be achieved with presently-available mechanisms without imposing a severe strain on the recording medium.

One object of the invention, therefore, is to provide an improved form of recording and/or reproducing mechanism especially adaptable to devices employing sensitized tape.

Another object of the invention is to provide an improved form of tape recorder and/or reproducer in which tape life is materially extended by substantially completely removing all tension from the tape in the region where it contacts the recording and/or reproducing head.

An additional object of the invention is to provide an improved form of tape recorder in which the movement of the recording medium is smooth or even under all conditions of operation, and in which a constant pressure is maintained upon the tape over its entire path except in the region where it engages the recording or playback head, thereby maintaining the tape movement essentially free of any transverse stresses which might result in a distortion thereof.

A further object of the invention is to provide a tape recorder and/or reproducer of the type set forth in which a continuous non-stretchable belt is provided which is designed to partially encircle each reel of tape and to overlie the outer layer thereof, this belt possessing inwardly-extending flanged edges forming a recess in which the outer tape layer is receivable.

Figure 2:
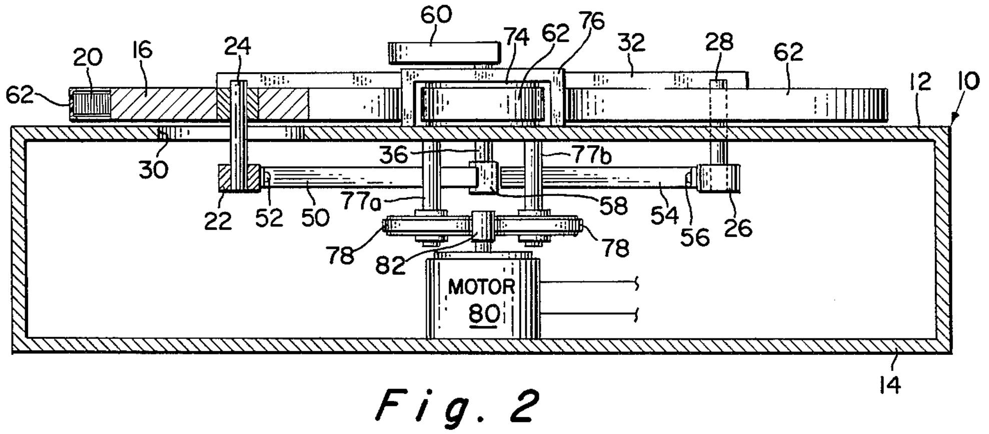
Figure 3:
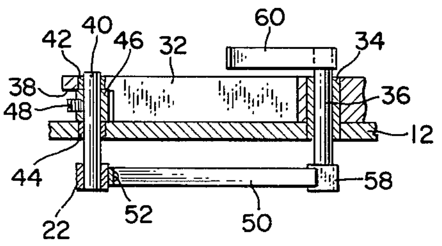
Figure 4:
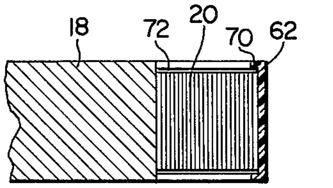

Other objects, advantages, and novel features of the invention will become apparent from the following detailed description of the invention when considered in conjunction with the accompanying drawings wherein:

FIG. 1 is a top view of a preferred form of tape recording and/or reproducing apparatus designed in accordance with the present invention;

FIGS. 2 and 3 are sectional views of FIG. 1 along the lines 2—2 and 3—3, respectively, and FIG. 4, is an enlarged cross-sectional view of FIG. 1 along the line 4—4.

Referring now to the particular embodiment of the invention illustrated in the drawing, there is shown a tape recorder and/or reproducer incorporating a driving mechanism designed in accordance with the present concept. A cabinet or housing, generally identified by the reference numeral 10, includes an upper or top panel 12 and a lower or bottom panel 14. Above the panel 12 is a pair of reels or spools 16 and 18 upon which a sensitized magnetic tape 20 is wound so as to be transferable therebetween upon selective rotation of the reels. For convenience of description, the reel 16 will hereinafter be designated the supply reel and the reel 18 will be designated the take-up reel, although obviously these terms are interchangeable depending upon the direction of movement of tape 20.

It is a characteristic of the present invention that the two reels 16 and 18 are so mounted that they may undergo a slight amount of positional displacement with respect to the panel 12. To achieve this objective, the reel 16 is mounted on one end of an arm 22 by means of a pivot pin 24. In the same manner, the reel 18 is mounted on one end of an arm 26 by means of a pivot pin 28. As will be best seen from FIG. 2, the arm 22 is located within the housing 10, with the pivot pin 24 passing through an opening 30 in the panel 12, this opening 30 permitting a limited transverse displacement of the pin 24 and hence of the reel 16 during operation of the apparatus. As will be subsequently brought out, the arms 22 and 26 (which carry the reels 16 and 18, respectively) are each designed for limited rotation about an axis perpendicular to the plane of the panel 12 and parallel to the axes of the pivot pins 24 and 28.

To maintain the arms 22 and 26 in their position as illustrated in FIGS. 1 and 2, there is provided a support bar 32, shown in FIG. 1 and further shown in FIG. 3. To facilitate an understanding of the manner in which the arms 22 and 26 are supported by the panel 12, the latter has been partially broken away in FIG. 1 to illustrate the elements lying thereunder. The support bar 32 is elongated in shape and extends from left to right (in the drawing) across the top surface of panel 12 and parallel to the upper and lower edges thereof. It is securely affixed to the panel surface by any suitable means. Three aligned openings are formed in the support bar 32 and in the panel 12, each of these three openings being equidistant from the upper edge of the panel. A bearing 34 is inserted within the middle opening, and a rotatable control shaft 36 extends therethrough.

Each outer extremity of the support bar 32 is recessed at 38 (only the left-hand arm-support assembly is illustrated in FIG. 3, but the right hand arm-support assembly is identical thereto) and a pin 40 extends through two bearings 42 and 44 carried in two aligned openings formed in the support bar 32 and panel 12. The two bearings 42 and 44 are thus spaced apart in the manner shown by FIG. 3, and a collar 46 encircles the pin 40 so as to lie between the panel 12 and the flanged outer extremity of the support bar. Collar 46 is provided with a manually-actuatable set screw 48 to allow for axial adjustment of the pin 40. The latter extends below the panel 12, and a force fit is established between this pin 40 and an opening in that end of the arm 22 opposite to the end in which the pin 24 is receivable (see FIGS. 1 and 2).

Each of the arms 22 and 26 is adapted to have an L-shaped leaf spring attached thereto, one of these springs 50 being attached to the arm 22 by the bolts 52, and the other of the springs 54 being attached to the arm 26 by the bolts 56. This is perhaps best shown in FIG. 1, each of the leaf springs 50 and 54 extending inwardly to a central point near the pin 36, at which location the springs 50 and 54 are selectively engaged by a cam 58 securely mounted on the pin 36. As above brought out, pin 36 extends through the support bar 32, and is provided with a manually actuatable handle 60 mounted on the upper extremity thereof. As perhaps best seen from FIG. 1, movement of handle 60 about the axis of pin 36 will cause the cam 58 to selectively exert pressure upon one or the other of the leaf springs 50 and 54. In FIG. 1 of the drawings the handle 60 is shown in one of its two positions, in which the spring 50 is placed under tension and the arm 22 (and consequently the reel 16) urged to the left in the drawing. In the other of its two positions, the cam 58 presses upon leaf spring 54 and urges the arm 26 (and reel 18) to the right in the drawing.

The two reels 16 and 18 are maintained in operating position by means of a belt 62. Before describing the action of this element, it should be noted that the sensitized tape 20, in moving from the supply reel 16 to the take-up reel 18, passes sequentially over a pair of capstans 64 and 66 which are disposed intermediate the reels, as best shown in FIG. 1. After passing over the capstan 64, and prior to passing over capstan 66, the tape 20 engages a recording and/or reproducing head 68, by means of which information is either impressed upon the tape 20 or read out therefrom, depending upon the particular type of operation being carried out.

Belt 62 is of the continuous type, and is disposed so as to overlie the tape 20 except when the latter is between the capstans 64 and 66. In other words belt 62 lies in direct contact with the outer layer of tape on reel 16, and remains in contact with the tape supplied from reel 16 up until the capstan 64 is reached. As best shown in FIG. 1 of the drawing, this distance between the outer layer of tape on reel 16 and the capstan 64 is held to a minimum so as to preclude the possibility of any lateral displacement of the tape in this region and also to prevent any fluttering of the recording medium when the apparatus is operated at relatively high speed. It will be noted that the tape being taken up on reel 18 is overlaid by the belt 62 between the capstan 66 and the outer layer on the take-up reel. The length of the belt 62 is so chosen, however, that substantially no gap exists between the capstan 66 and the outer tape layer upon reel 18, with the outer tape layer of reel 18 pressing directly upon capstan 66 through the thickness of the belt 62. This close relationship of the parts is instrumental in bringing about an extremely "tight" mode of operation, and hence a considerable increase in the fidelity of recording and/or reproduction.

Belt 62 is fabricated of some flexible non-stretchable material, preferably a plastic such, for example, as Mylar. To achieve best results, the belt 62 has the cross-sectional configuration shown in FIG. 4 of the drawing—that is, provided with flanged edges 70 which establish a recess 72 within which the tape 20 is receivable. When employing this type of configuration for the belt 62, the tape 20 is precluded from any appreciable sidewise or transverse displacement with respect to the belt, and, furthermore, the belt is precluded from slipping off the reels 16 and 18 during operation. It might be noted in passing that it is highly desirable for the material of which the belt 62 is constructed to be essentially impervious to moisture, and to be highly resistive to cracking or splitting even after extended periods of use.

From the drawings it will be noted that the belt 62 does not follow the tape 20 between the captans 64 and 66, but instead passes over the periphery of an idler roller 74 which is not directly secured to any stationary component of the assembly, but instead "floats" freely and partly within an enclosure 76. It is maintained in position solely by the inward pressure of the belt 62 against the capstans 64 and 66. The rollers 74 has a relatively large diameter so as to insure good frictional engagement between the belt 62 and the capstans 64 and 66, since the large size of the roller 74 results in the belt 62 passing over a major portion of the circumference of the captans 64 and 66. The tension of the belt 62 causes the roller 74 to exert a strong radial pressure against the captans 64 and 66 through the material of which the belt is composed.

To achieve accuracy and reliability in operation, it is necessary that each of the capstans 64 and 66 be driven by a source of power at precisely identical speeds. When such a synchronized driving action is present, that portion of tape 20 which extends between the capstans 64 and 66 is completely free from tension, since successive tape portions enter the region of the head 68 at the same rate at which preceding tape portions leave the region. This entirely eliminates all "pull" on, or "flutter" of, the tape in the region where the recording and/or reproduction occurs. Furthermore, since the tape does not leave the supply reel 16 until just prior to its engagement with the capstan 64, there is practically no possibility of it being displaced laterally as it passes over the capstan surface, and hence the objectionable "skewing" which was present in former designs is completely eliminated.

The capstans 64 and 66 are mounted on shafts **77*a* and 77*b*, respectively, each of which carries on the lower extremity thereof a collar or flange 78 composed of some such material as rubber or plastic. It is intended that both capstans 64 and 66 be driven by a single source of power, and in FIG. 2 such source is the electric motor 80, the output shaft 82 of which directly contacts each of the collars or flanges 78. It will thus be appreciated that upon energization of motor 80, the capstans 64 and 66 will be rotated in the same direction (clockwise as viewed in FIG. 1) to cause a transfer of the sensitized tape 62 from reel 16 to reel 18** in the manner described above.

As brought out by FIG. 1, the recording and/or reproducing head 68 is mounted on a slotted support member 84, the vertical position of which (in the drawing) is adjustable following a loosening of set screw 86. It is important that head 68 be positioned so that it engages the tape 62 with a minimum of frictional contact, since the amount of pressure which the head places upon the tape is a prominent factor in tape wear, and thus in a sense is inversely proportional to the life expectancy of the recording medium.

It is not necessary that the two capstans 64 and 66 be of identical size if means is provided for driving the shafts **77*a* and 77*b* at such speeds that the tape 20 passes over the capstans without the introduction of tension in the vicinity of the recording and/or reproducing head 68. For example, the respective diameters of the two collars 78 may be functionally related to the diameters of the capstans 64 and 66** such that the tape speed over each capstan is the same.

Although the members 64 and 66 have been described as driven capstans, they can alternatively be free-running rollers, with the element 74 being mounted on a driven shaft such as the shaft 82 of motor 80.

Obviously many modifications and variations of the present invention are possible in the light of the above teachings. It is therefore to be understood that within the scope of the appended claims the invention may be practiced otherwise than as specifically described.

I claim:

1. In a device for recording and/or reproducing data, the combination of:

(a) a pair of reels lying essentially in a single plane, (b) a sensitized magnetic tape adapted to be wound on one reel as it is unwound from the other reel, the two said reels lying in spaced-apart relation within said single plane, (c) a pair of capstans disposed intermediate the two reels, (d) a continuous belt composed of flexible, non-stretchable material overlying the outer layer of tape on each of said reels and in direct contact with such outer layers, said belt being so arranged as to pass sequentially over each of said pair of capstans as said tape is unwound from one reel and wound on the other, (e) means for causing said belt to form a loop between said capstans so that it is out of contact with said tape between said capstans, (f) a recording and/or reproducing head disposed to contact said sensitized tape as it passes between said capstans, and (g) means for applying an equal drawing force to each of said capstans to synchronously rotate the latter and hence apply a driving force to said belt and to the tape wound on said reels, (h) whereby said tape is caused to freely pass between said capstans solely in response to the frictional action of said belt, and without any longitudinal stress or tension whatsoever being present on said tape from the time it leaves one capstan until it reaches the other.

2. The combination of claim 1, in which the means for synchronously rotating the two capstans includes a motor and a pair of shafts upon which the two capstans are respectively mounted, the drive shaft of the motor frictionally engaging each of the capstan shafts so as to apply power simultaneously thereto.

3. The combination of claim 1, in which the means for causing said belt to form a loop includes an idler roller arranged so that said belt passes over a major portion of its periphery, said idler roller being of the "free-floating" type and maintained in contact with said pair of capstans solely by pressure of said belt thereupon.

4. The combination of claim 1, in which said belt is provided with an inwardly-extending flange on each edge thereof, the said sensitized tape lying within the recess in the belt formed by said flanges, whereby said tape is precluded from undergoing any appreciable transverse displacement with respect to said belt during operation of said device.

References Cited by the Examiner

UNITED STATES PATENTS

| | | | |
|---|---|---|---|
| 2,658,398 | 11/1953 | Masterson | 242—55.14 X |
| 2,675,185 | 4/1954 | Zenner | 242—54.1 |
| 3,114,512 | 12/1963 | Peshel et al. | 242—55.12 |
| 3,125,311 | 3/1964 | Willis | 242—55.14 |

FOREIGN PATENTS

| | | |
|---|---|---|
| 270,050 | 5/1927 | Great Britain. |
| 751,075 | 12/1952 | Germany. |

MERVIN STEIN, *Primary Examiner.*